Feb. 16, 1937.     C. L. EKSERGIAN     2,071,280
METHOD OF MAKING VEHICLE WHEELS
Filed May 1, 1934
FIG.1
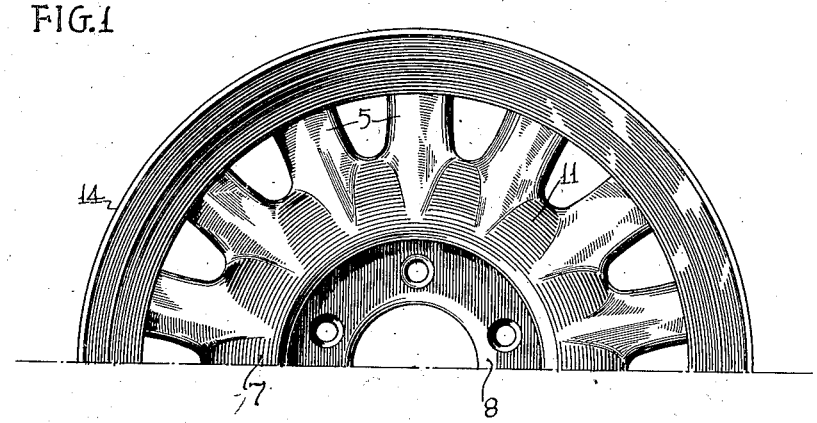
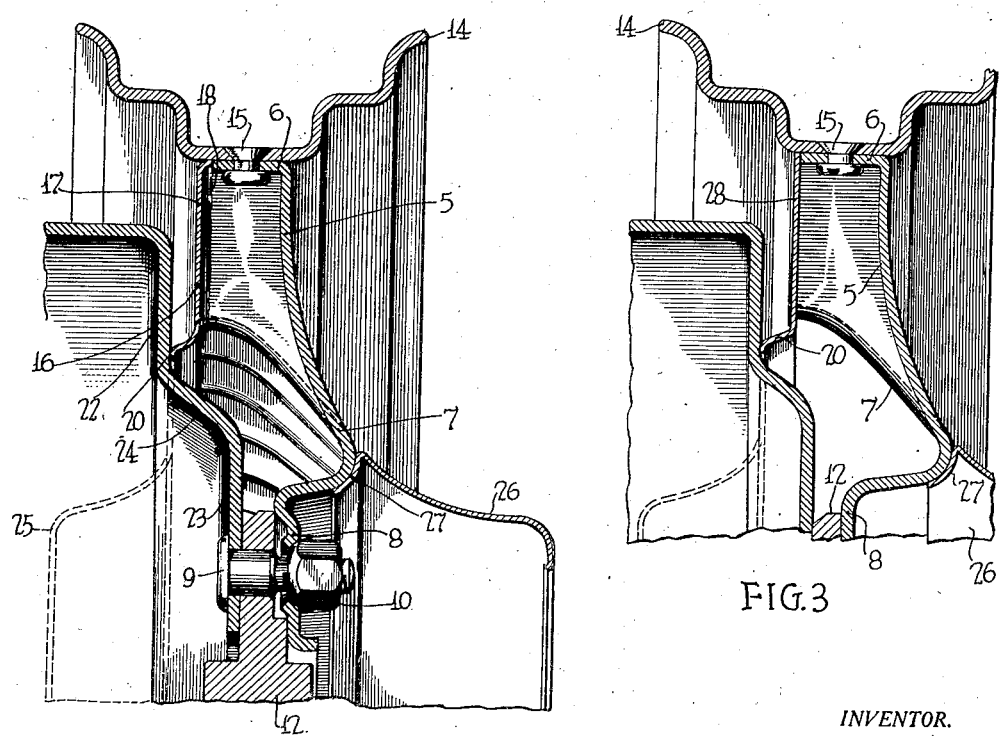
FIG.2              FIG.3
INVENTOR.
Carolus L. Eksergian.
BY John P. Tarbox
ATTORNEY.

Patented Feb. 16, 1937

2,071,280

UNITED STATES PATENT OFFICE 2,071,280

METHOD OF MAKING VEHICLE WHEELS

Carolus L. Eksergian, Detroit, Mich., assignor to Budd Wheel Company, Philadelphia, Pa., a corporation of Pennsylvania Application May 1, 1934, Serial No. 723,307

7 Claims. (Cl. 29—159.03)

My invention relates to the method of making vehicle wheels and particularly to the method of making pressed sheet metal wheels of the artillery type for automobiles.

One object of my invention is to facilitate fabrication and assembly of wheels of the above-indicated character.

Another object of my invention is to provide a novel wheel structure that shall compensate for relative movement or weave of its parts and that shall be closed through the expeditious form and relation of a brake drum head to other parts.

A further object of my invention is to provide a wheel that shall be simple and durable in construction, strong, of light weight, economical to manufacture, and effective in its operation.

I attain the foregoing and other objects by the method and article disclosed herein.

Figure 1 of the accompanying drawing is a view, in front elevation, of one-half of a wheel embodying my invention;

Figure 2 is an enlarged view, in axial section through one of the spokes, of the device shown in Fig. 1, and Figure 3 is a view, similar to portions of Figure 2, of a slightly varied structure using the invention.

Referring to Figs. 1 and 2, a front spider 11, preferably of relatively heavy gauge metal or stainless sheet steel, has rear opening channel spokes 5 closed at the outer ends by elements or portions 6, a conical nave 7 and a radially inner flange 8 for mounting, as by usual bolts 9 and nuts 10, to a hub flange 12.

A drop center rim 14 or other form rim is secured to the elements 6, as by rivets 15, spot welding or other means.

A rear spider 16, preferably of thin gauge sheet metal, embodies spoke portions 17 having forwardly turned edges 18 conforming to the contours of the spoke portions 5 and preferably flash welded thereto, and a radially-inner flexible annular portion 20 having its inner periphery of only slightly less diameter than the diameter of the inner end spoke portions adjacent thereto, i. e. near the nave periphery. The portion 20 is preferably, as shown, of sloping or curved axial section to compensate for relative weave caused by side thrust on the wheel or radial yield between the parts thereof. In the form shown, the portion 20 is axially offset, or projects, rearwardly from the portion 17, but it may be in the plane of the portions 17, or of other form and disposition.

A brake drum has axially offset head portions 22 and 23 joined by a sloping portion 24, the latter of which is secured to the hub flange 12, by the studs 9, thus completing the closure of the front spider.

In fabricating the rear spider, it is initially punched or pressed from a blank to have a portion 25, indicated by dotted lines, in at least partially the form of a hub shell or hub cap 26 which is cut from the rear spider blank and later provided with a flange 27 or other desired parts.

In assembling the parts, the front and rear spiders may first be placed and/or secured to each other. The rim 14 may then be secured in place by inserting a backing plate, in the form of a tool or implement radially outwardly in the spokes from the space between the portion 20 and the flange 8. After this operation, the wheel may be mounted in relation to a brake drum head and secured to complete the closure of the front spider. The wheel body at 20 provides a resilient engagement with the brake drum assisting in the provision of a yielding wheel mounting. The assembling operations may partake of a different order, such for example, as the securement of the front spider member by riveting or welding to the rim and subsequently by the attachment of the rear spider member to the front spider member by suitable welding operations such as those previously mentioned.

It can be seen that by the mode of fabrication explained, both the false hub shell 26 and the rear spider 17 may be evolved from one stamping. By means of the provision of dies which sever the parts as well as form them the number of operating steps may be materially reduced.

In the form of my invention shown in Fig. 3, the construction and methods of fabrication and assembly are similar to those above described, except that the spoke portions 28 of the rear spider, instead of having the front-turned edges 18 flash welded to the front spoke portions 5, lie flat against the relatively thick front spoke rear edges and are spot or spud welded thereto.

In all of the structure and its method of fabrication and assembly, economy of die work, welding and other labor and material is effected to a marked degree, and a wheel of neat appearance, compact structure effective operation and other advantages is obtained.

Although I have shown and described particular forms of my invention, changes may be effected therein without departing from the spirit and scope thereof, as set forth in the appended claims.

What I claim is:

1. In a process for making a sheet-metal wheel including complemental spiders providing a nave and tubular section spokes, the method of fabrication which comprises pressing one of the spiders to have a central portion in at least partially the form of a hub cap and cutting said portion from the spider.

2. In a process for making a sheet-metal wheel including axially-spaced front and rear elements, and a hub cap on said front element, the method of fabrication which comprises pressing said rear element to have a portion in at least partially the form of the cap and cutting said portion from the rear element.

3. In a process for making a sheet-metal wheel including an offset annular flange and a hub cap, the method of fabrication which comprises pressing a wheel body portion in at least partially the form of said cap with the flange thereabout, and severing the body between the cap and the flange to remove the cap.

4. In a process for making a sheet-metal wheel including a hub cap, the method of fabrication which comprises pressing a wheel body portion to at least partially form the cap and cutting said cap portion from the body.

5. In a process for making a sheet-metal wheel including a front heavy-gauge spider having rear opening channel section spokes, and a rear thin-gauge spider closing said spokes, the method of fabrication which comprises pressing said rear spider to have a central portion in at least partially the form of a hub cap for the front spider and cutting said portion from the rear spider.

6. The method of making metallic vehicle wheels which comprises forming a spider shaped relatively heavy gauge body member, stamping a complementally shaped relatively light gauge spider member, forming a false hub shell portion in said light gauge spider stamping, severing the parts in the light gauge material and securing the spider shaped portion and the hub shell shaped portion of light gauge metal to the spider of heavy gauge metal.

7. The method of making vehicle wheels which comprises simultaneously stamping a spider-shaped portion and partially forming a hub shell portion of sheet metal, severing said portions and completing the formation of the hub shell portion, securing a spider shaped wheel body to a rim and securing said hub shell and spider portions to the wheel body.

CAROLUS L. EKSERGIAN.